(12) United States Patent
Rosenflanz et al.

(10) Patent No.: US 10,696,883 B2
(45) Date of Patent: Jun. 30, 2020

(54) SHAPED ABRASIVE PARTICLES, METHODS OF MAKING, AND ABRASIVE ARTICLES INCLUDING THE SAME

(71) Applicant: 3M INNOVATIVE PROPERTIES COMPANY, St. Paul, MN (US)

(72) Inventors: Anatoly Z. Rosenflanz, Maplewood, MN (US); Negus B. Adefris, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 432 days.

(21) Appl. No.: 14/439,606

(22) PCT Filed: Oct. 17, 2013

(86) PCT No.: PCT/US2013/065421
§ 371 (c)(1),
(2) Date: Apr. 29, 2015

(87) PCT Pub. No.: WO2014/070468
PCT Pub. Date: May 8, 2014

(65) Prior Publication Data
US 2015/0267097 A1    Sep. 24, 2015

Related U.S. Application Data

(60) Provisional application No. 61/720,721, filed on Oct. 31, 2012.

(51) Int. Cl.
*C09K 3/14*    (2006.01)
*B24D 3/16*    (2006.01)
(Continued)

(52) U.S. Cl.
CPC .............. *C09K 3/1409* (2013.01); *B24D 3/08* (2013.01); *B24D 3/16* (2013.01); *B24D 3/24* (2013.01);
(Continued)

(58) Field of Classification Search
CPC ........... C09K 3/1406; B24D 3/08; B24D 3/16
See application file for complete search history.

(56) References Cited

U.S. PATENT DOCUMENTS 2,958,593 A    11/1960  Hoover
3,859,407 A *   1/1975  Blanding ................... B01J 2/22
                                                          241/3
(Continued)

FOREIGN PATENT DOCUMENTS

CN    1032512 A    4/1989
CN    1301615 A    7/2001
(Continued)

OTHER PUBLICATIONS

Cahoon, "Sintering and Grain Growth of Alpha-Alumina", Journal of the American Ceramic Society, Oct. 1956, vol. 39, No. 10, pp. 337-344.
(Continued)

*Primary Examiner* — Pegah Parvini
(74) *Attorney, Agent, or Firm* — Bradford B. Wright

(57) ABSTRACT

A method of making abrasive particles includes: providing a slurry comprising non-colloidal solid particles and a liquid vehicle; forming at least a portion of the slurry into shaped bodies contacting a substrate; at least partially drying the shaped bodies to provide shaped abrasive precursor particles; separating at least a portion of the shaped abrasive precursor particles from the substrate; and converting at least a portion of the shaped abrasive precursor particles into shaped abrasive particles. The shaped abrasive particles
(Continued)

comprise alpha alumina having an average crystal grain size of 0.8 to 8 microns and an apparent density that is at least 92 percent of the true density. Each shaped abrasive particle has a respective surface comprising a plurality of smooth sides that form at least four vertexes. Shaped abrasive particles, abrasive articles including them, and methods of using are also disclosed.

17 Claims, 4 Drawing Sheets

(51) Int. Cl.
    B24D 3/30 (2006.01)
    B24D 11/00 (2006.01)
    B24D 3/24 (2006.01)
    B24D 3/08 (2006.01)
    C04B 35/626 (2006.01)
    C04B 35/111 (2006.01)

(52) U.S. Cl.
    CPC ............ B24D 3/30 (2013.01); B24D 11/00 (2013.01); C04B 35/1115 (2013.01); C04B 35/6263 (2013.01); C09K 3/1436 (2013.01); C04B 2235/3201 (2013.01); C04B 2235/3206 (2013.01); C04B 2235/3218 (2013.01); C04B 2235/3232 (2013.01); C04B 2235/3262 (2013.01); C04B 2235/3272 (2013.01); C04B 2235/349 (2013.01); C04B 2235/3418 (2013.01); C04B 2235/5436 (2013.01); C04B 2235/5445 (2013.01); C04B 2235/656 (2013.01); C04B 2235/72 (2013.01); C04B 2235/77 (2013.01)

(56) References Cited

U.S. PATENT DOCUMENTS

| | | | |
|---|---|---|---|
| 4,227,350 A | 10/1980 | Fitzer | |
| 4,252,544 A | 2/1981 | Takahashi | |
| 4,263,381 A | 4/1981 | McEntire | |
| 4,314,827 A | 2/1982 | Leitheiser | |
| 4,543,107 A | 9/1985 | Rue | |
| 4,588,419 A | 5/1986 | Caul | |
| 4,623,364 A | 11/1986 | Cottringer et al. | |
| 4,734,104 A | 3/1988 | Broberg | |
| 4,737,163 A | 4/1988 | Larkey | |
| 4,741,743 A | 5/1988 | Narayanan | |
| 4,744,802 A | 5/1988 | Schwabel | |
| 4,751,138 A | 6/1988 | Tumey | |
| 4,788,167 A | 11/1988 | Mathers | |
| 4,800,685 A | 1/1989 | Haynes, Jr. | |
| 4,855,264 A | 8/1989 | Mathers | |
| 4,898,597 A | 2/1990 | Hay | |
| 4,957,886 A | 9/1990 | Mathers | |
| 4,991,362 A | 2/1991 | Heyer | |
| 4,997,461 A | 3/1991 | Markhoff-Matheny | |
| 5,037,453 A | 8/1991 | Narayanan | |
| 5,152,917 A | 10/1992 | Pieper | |
| 5,164,348 A * | 11/1992 | Wood | C01F 7/02 501/1 |
| 5,201,916 A | 3/1993 | Berg | |
| 5,203,884 A | 4/1993 | Buchanan | |
| 5,378,251 A | 1/1995 | Culler | |
| 5,409,645 A | 4/1995 | Torre, Jr. | |
| 5,435,816 A | 7/1995 | Spurgeon | |
| 5,436,063 A | 7/1995 | Follett | |
| 5,443,906 A | 8/1995 | Pihl | |
| 5,445,807 A | 8/1995 | Pearson | |
| 5,453,104 A | 9/1995 | Schwabel | |
| 5,496,386 A | 3/1996 | Broberg | |
| 5,516,348 A * | 5/1996 | Conwell | C09K 3/1436 501/153 |
| 5,520,711 A | 5/1996 | Helmin | |
| 5,549,961 A * | 8/1996 | Haas | B24D 3/28 428/143 |
| 5,591,239 A | 1/1997 | Larson | |
| 5,609,706 A | 3/1997 | Benedict | |
| 5,611,829 A * | 3/1997 | Monroe | C04B 35/1115 501/128 |
| 5,645,618 A | 7/1997 | Monroe | |
| 5,651,801 A | 7/1997 | Monroe | |
| 5,672,097 A | 9/1997 | Hoopman | |
| 5,679,067 A | 10/1997 | Johnson | |
| 5,681,361 A | 10/1997 | Sanders, Jr. | |
| 5,712,210 A | 1/1998 | Windisch | |
| 5,776,214 A | 7/1998 | Wood | |
| 5,858,140 A | 1/1999 | Berger | |
| 5,863,308 A | 1/1999 | Qi | |
| 5,903,951 A | 5/1999 | Ionta | |
| 5,928,070 A | 7/1999 | Lux | |
| 5,946,991 A | 9/1999 | Hoopman | |
| 5,961,674 A | 10/1999 | Gagliardi | |
| 5,975,987 A | 11/1999 | Hoopman | |
| 5,975,988 A | 11/1999 | Christianson | |
| 6,017,831 A | 1/2000 | Beardsley | |
| 6,054,093 A | 4/2000 | Torre, Jr. | |
| 6,129,540 A | 10/2000 | Hoopman | |
| 6,228,134 B1 * | 5/2001 | Erickson | B24D 3/14 264/172.15 |
| 6,749,653 B2 | 6/2004 | Castro | |
| 6,790,126 B2 | 9/2004 | Wood | |
| 8,034,137 B2 | 10/2011 | Erickson | |
| 8,123,828 B2 | 2/2012 | Culler | |
| 8,142,531 B2 | 3/2012 | Adefris | |
| 8,142,532 B2 | 3/2012 | Erickson | |
| 8,142,891 B2 | 3/2012 | Culler | |
| 8,480,772 B2 | 7/2013 | Welygan | |
| 8,551,577 B2 | 10/2013 | Moren | |
| 8,764,865 B2 | 7/2014 | Boden | |
| 2007/0074456 A1 * | 4/2007 | Orlhac | B24D 3/00 51/307 |
| 2009/0165394 A1 | 7/2009 | Culler | |
| 2010/0146867 A1 | 6/2010 | Boden | |
| 2010/0151195 A1 | 6/2010 | Culler | |
| 2010/0151196 A1 | 6/2010 | Adefris | |
| 2010/0151201 A1 | 6/2010 | Erickson | |
| 2010/0319269 A1 | 12/2010 | Erickson | |
| 2011/0083374 A1 * | 4/2011 | Querel | B24D 3/14 51/308 |
| 2013/0337725 A1 | 12/2013 | Monroe | |

FOREIGN PATENT DOCUMENTS

| | | |
|---|---|---|
| CN | 1471567 A | 1/2004 |
| EP | 0651778 | 5/1995 |
| GB | 965231 | 7/1964 |
| GB | 986847 | 3/1965 |
| JP | 4-159386 | 6/1992 |
| JP | 4-159387 | 6/1992 |
| JP | 9-505101 A | 5/1997 |
| JP | 2004-510873 A | 4/2004 |
| JP | 2012-512045 A | 5/2012 |
| RU | 2126318 C1 | 2/1999 |
| WO | WO 94-02559 | 2/1994 |
| WO | WO 95/13251 | 5/1995 |
| WO | WO 01/23322 A1 | 4/2001 |
| WO | WO 2003/104161 A | 12/2003 |
| WO | WO 2004/011196 A | 2/2004 |
| WO | WO 2010/077495 | 7/2010 |
| WO | WO 2011-068714 | 6/2011 |
| WO | WO 2011-068724 | 6/2011 |
| WO | WO 2011-109188 | 9/2011 |
| WO | WO 2011-139562 | 11/2011 |
| WO | WO 2012-018903 | 2/2012 |
| WO | WO 2012-061016 | 5/2012 |
| WO | WO 2012-061033 | 5/2012 |
| WO | WO 2012-112305 | 8/2012 |
| WO | WO 2012-112322 | 8/2012 |
| WO | WO 2012-141905 | 10/2012 |
| WO | WO 2013-009484 | 1/2013 |

(56) References Cited

FOREIGN PATENT DOCUMENTS

| WO | WO 2013-036402 | 3/2013 |
| WO | WO 2013-045251 | 4/2013 |
| WO | WO 2013-070576 | 5/2013 |
| WO | WO 2015-050781 | 4/2015 |

OTHER PUBLICATIONS

International Search Report for PCT International Application No. PCT/US2013/065421 dated Jan. 28, 2014, 4 pages.
Extended European Search Report, Application No. 13850476.6, dated Jun. 17, 2016, 3 pages.

* cited by examiner

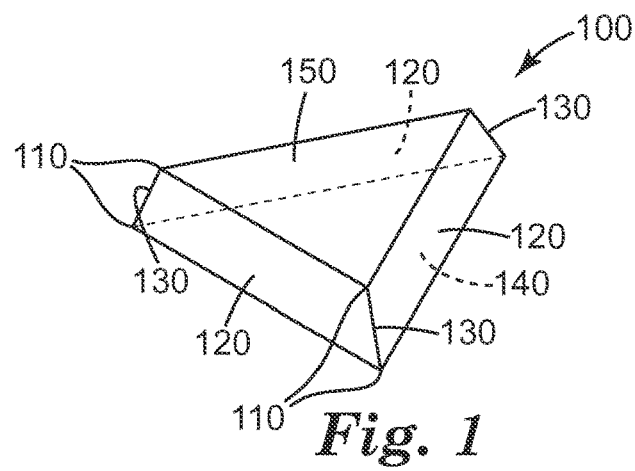
Fig. 1
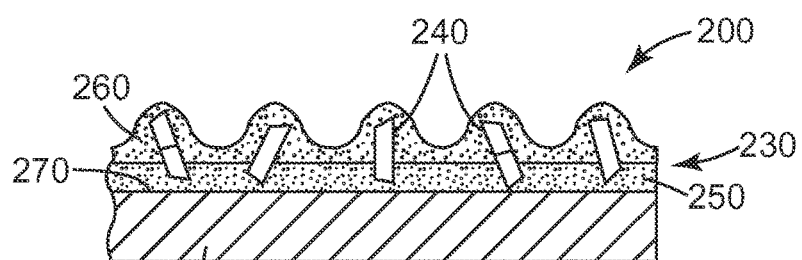
Fig. 2
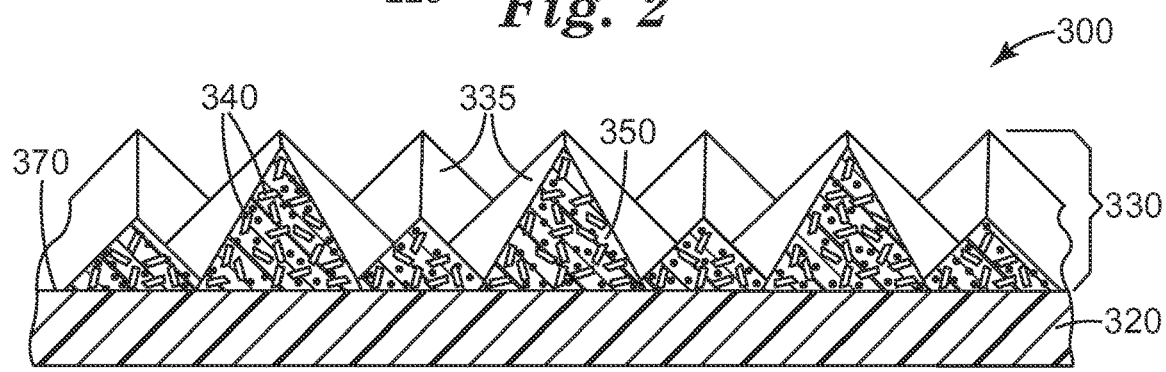
Fig. 3
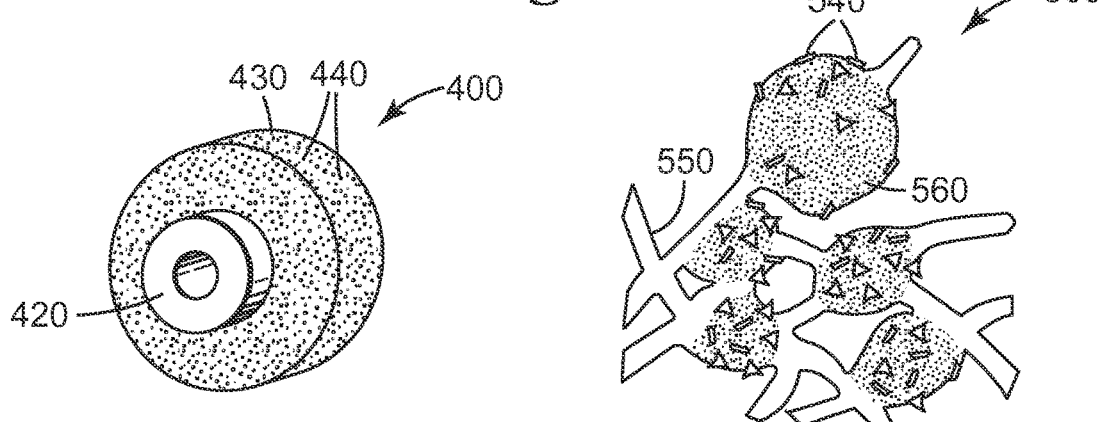
Fig. 4
Fig. 5

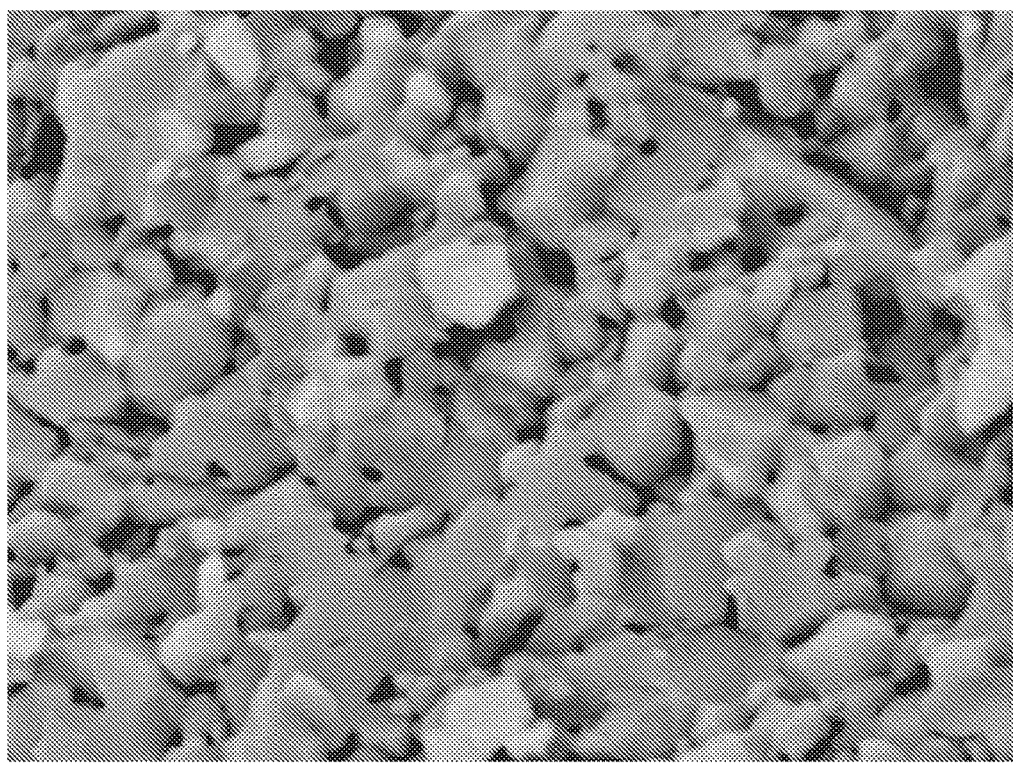
*Fig. 6*  10 µm
*Fig. 7*  10 µm

SHAPED ABRASIVE PARTICLES, METHODS OF MAKING, AND ABRASIVE ARTICLES INCLUDING THE SAME

FIELD

The present disclosure broadly relates to alumina-based abrasive particles, methods of making them and abrasive articles including them.

BACKGROUND

Alumina (i.e., $Al_2O_3$), is one of the most important abrasive minerals known to the abrasive industry because of its balance of cost, good thermal conductivity, strength, toughness, and chemical inertness leading to excellent grinding characteristics in coated and bonded abrasives. It has long been known that microstructural refinement leads to improvements in abrasive characteristics. Thus, premium alumina grains produced via a chemical sol-gel route and yielding fully dense sintered structures with exceedingly fine microstructures (<0.5 microns) were developed (e.g., see U.S. Pat. No. 4,314,827 (Leitheiser et al.) and introduced into the abrasives market. The introduction of shaped abrasive particles formed of sol-gel derived alpha alumina has revolutionized the abrasives industry. These abrasive particles typically outperform corresponding crushed particles made of the same material in abrading applications. However, such sol-gel-derived abrasive particles can only be obtained in sizes smaller than about 20 mesh (U.S. mesh size). Attempts to produce larger abrasive particles using the sol-gel technique are generally not successful due to cracking associated with the need to remove large quantity of volatile material during drying.

Thus, it is desirable to provide powder-derived alumina abrasives without limitations on grit dimensions and with grinding characteristics similar to better than that of a sol-gel grain. While powder-derived $Al_2O_3$ abrasives are also available (e.g., as a CCC grain from Treibacher Schleifmittel AG, Villach, Austria or as sintered alumina from ShowaDenko KK, Tokyo, Japan), their utility has been limited due to coarser microstructures that generally accompany powder-sintering method.

The mechanical properties of alpha alumina are often influenced by the presence of impurities. In particular, it is widely known that impurities such as sodium have deleterious effects in the formation of alpha alumina from alumina precursors. For example, the presence of sodium oxide causes an increase the crystal grain size of the alpha alumina after sintering, resulting in decreased hardness and/or fracturing during the sintering process. Currently, it is thought in the abrasives industry that microstructure coarsening significantly above about 1-2 micron crystal alpha alumina grain size range is not practical for use in abrasive particles for use in coated abrasive and precision grinding applications.

Accordingly, high purity alpha alumina precursors are commercially used in the production of shaped alpha alumina abrasive particles. These precursors are correspondingly expensive.

SUMMARY

In one aspect, the present disclosure provides a method of making abrasive particles, the method comprising:
providing a slurry comprising non-colloidal solid particles and a liquid vehicle, wherein at least some of the non-colloidal solid particles comprise at least one of alpha alumina or an alpha alumina precursor, and wherein the non-colloidal solid particles comprise at least 30 percent by volume of the slurry;

forming at least a portion of the slurry into shaped bodies contacting a substrate, wherein the shaped bodies are formed substantially according to a predetermined shape;

at least partially drying the shaped bodies to provide shaped abrasive precursor particles;

separating at least a portion of the shaped abrasive precursor particles from the substrate; and converting at least a portion of the shaped abrasive precursor particles into shaped abrasive particles, wherein the shaped abrasive particles comprise alpha alumina, wherein the alpha alumina has an average crystal grain size of from 0.8 to 8 microns, wherein the alpha alumina has an apparent density that is at least 92 percent of the true density, and wherein each of the shaped abrasive particles has a respective surface comprising a plurality of sides and at least four vertexes, and wherein the shaped abrasive particles conform to a nominal predetermined shape.

In another aspect, the present disclosure provides shaped abrasive particles made according to the above method.

In yet another aspect, the present disclosure provides shaped abrasive particles comprising alpha alumina, wherein the alpha alumina has an average crystal grain size of 0.8 to 8 microns, wherein the alpha alumina has an apparent density that is at least 92 percent of the true density, wherein each of the shaped abrasive particles has a respective surface comprising a plurality of sides and at least four vertexes, and wherein the shaped abrasive particles conform to a nominal predetermined shape.

Shaped abrasive particles according to the present disclosure are useful, for example, in manufacture of abrasive articles (e.g., coated abrasives, bonded abrasives, abrasive brushes, and/or nonwoven abrasives).

Accordingly, in yet another aspect, the present disclosure provides an abrasive article comprising shaped abrasive particles retained in a binder, wherein the shaped abrasive particles comprising alpha alumina, wherein the alpha alumina has an average crystal grain size of from 0.8 to 8 microns, wherein the alpha alumina has an apparent density that is at least 92 percent of the true density, and wherein the shaped abrasive particles conform to a nominal predetermined shape.

Abrasive particles and abrasive articles according to the present disclosure are useful, for example, for abrading a workpiece.

In yet another aspect, the present disclosure provides a method of abrading a workpiece, the method comprising contacting at least one shaped abrasive particle contained in an abrasive article according to the present disclosure with a workpiece, and moving at least one of abrasive article or the workpiece relative to the other to abrade at least a portion of the workpiece.

As used herein:

the term "apparent density" refers to the mass of a material divided by its apparent volume (i.e., the volume including interior void space);

the term "colloid" refers to a system in which finely divided particles, which are approximately 10 to 10,000 angstroms in size, are dispersed within a continuous liquid medium in a manner that prevents them from being filtered easily or settled rapidly;

the term "crystal grain" refers to an individual crystal in a single crystal or monocrystalline material in which the crystal lattice of the individual crystal is continuous and unbroken to its edges with no internal grain boundaries;

the term "grain boundary" refers to a defect in the crystal structure of a crystal grain forming an interface between two crystal grains, or crystallites, in a polycrystalline material;

the term "mesh" used in reference to particle size refers to U.S. mesh size, unless otherwise indicated;

the term "non-colloidal" means not having the characteristics of a colloid.

the term "shaped" means that the shape is a result of intentional shaping according to a predetermined shape during manufacture;

the term "smooth" in reference to a surface means that the surface is free from irregularities, roughness, or projections, other than those that may be caused due to irregularities caused by the manufacturing process used to make it;

the term "true density" refers to the density of a given material, excluding any interior void volume in the material, determined at a given pressure and temperature (e.g., one atmosphere pressure and a temperature of 25° C.).

the phrase "wherein the shaped abrasive particles conform to a nominal predetermined shape" means that the shapes of the shaped abrasive particles substantially corresponds to an intended (predetermined) nominal shape, determined by the method in which they were made (e.g., by molding, extrusion, or screen printing), allowing for shrinkage during drying, calcining, and sintering, and random deviations (e.g., minor warping or defects) that may occur due to process variability.

Advantageously, shaped abrasive particles according to the present disclosure may exhibit excellent abrasive characteristics when incorporated in coated, bonded, and/or non-woven abrasives, e.g., in the form of discs and/or belts. Further, grinding characteristics of the shaped abrasive particles are substantially retained even when the alumina microstructure within the shaped abrasive particles (i.e., crystal grain size) coarsens significantly above about 1-2 micron range (a crystal grain size level that is generally accepted in the art as borderline useful for coated abrasive and precision grinding applications). This contrasts with the alumina microstructure in commercially available sol-gel-derived shaped abrasive particles.

Advantageously, abrasive particles according to the present disclosure can be made using less expensive starting materials than would be used in a typical sol-gel process, while achieving substantially equivalent (or better) abrading performance.

The features and advantages of the present disclosure will be further understood upon consideration of the detailed description as well as the appended claims.

BRIEF DESCRIPTION OF THE DRAWINGS

FIG. 1 is a schematic perspective view of an exemplary shaped abrasive particle 100 according to the present disclosure.

FIG. 2 is a schematic side view of an exemplary coated abrasive article 200 according to the present disclosure.

FIG. 3 is a schematic side view of another exemplary coated abrasive article 300 according to the present disclosure.

FIG. 4 is a schematic perspective view of an exemplary grinding wheel 400 according to the present disclosure.

FIG. 5 is a schematic depiction, enlarged about 100×, of an exemplary nonwoven abrasive article 500 according to the present disclosure.

FIG. 6 is a scanning electron microscopy (SEM) micrograph of a fracture surface of shaped abrasive particles of Example 5.

FIG. 7 is an SEM micrograph of a corner of Example 6 shaped abrasive grain fired at 1550° C.

Figure 8:
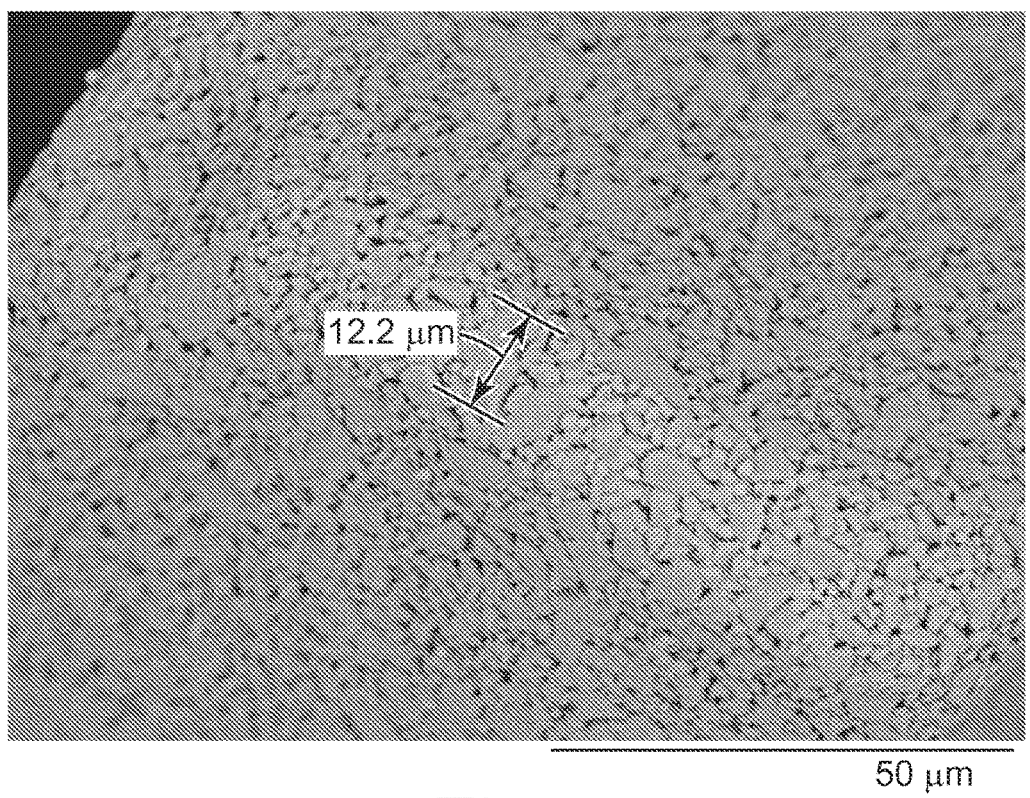
FIG. 8 is an SEM micrograph of an edge of Example 6 shaped abrasive grain fired at 1575° C.

While the above-identified drawing figures set forth several embodiments of the present disclosure, other embodiments are also contemplated; for example, as noted in the discussion. In all cases, the disclosure is presented by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Shaped abrasive particles according to the present disclosure can be made according to a multi-step process using a slurry comprising non-colloidal solid particles and a liquid vehicle. Typically, the non-colloidal solid particles are suspended in the liquid vehicle; however, it is also acceptable to have some settling of the non-colloidal solid particles. At least some of the non-colloidal solid particles comprise at least one of alpha alumina or a precursor thereof. In some embodiments, the non-colloidal solid particles comprise alpha alumina particles, alpha alumina precursor particles, or a combination thereof. In some embodiments, substantially all (e.g., at least 95 percent by weight or at least 99 percent by weight), or all, of the non-colloidal solid particles comprise alpha alumina particles, alpha alumina precursor particles, or a combination thereof.

The alpha alumina particles and non-colloidal alpha alumina precursor particles, taken individually, or collectively if both are present, may comprise at least 30, 35, 40, 50, or even at least 55 percent by volume of the slurry. The slurry may further comprise one or more optional additives such as, for example, thickener(s) thixotrope(s), dispersant(s), wetting agent(s), defoamer(s), coupling agent(s), modifying agent(s) or precursor(s) thereof, nucleating agent(s), peptizing agent(s), and/or mold release agent(s). Useful thickeners include: organic thickener(s) such as, for example, guar gum, sodium carboxymethyl cellulose, and/or carbomers; and inorganic thickeners such as, for example, colloidal boehmite.

Modifying additives can function to enhance some desirable property of the abrasive particles or increase the effectiveness of the subsequent sintering step. Modifying additives or precursors of modifying additives can be in the form of micron-scale and submicron-scale particulates, nano-colloids (i.e., nanometer-scale colloids), soluble salts, typically water soluble salts and non-soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The determination of the specific level of such additives is within the capability of one of ordinary skill in the art.

Nucleating agents suitable for inclusion in the slurry may include, for example, fine particles of alpha alumina, alpha ferric oxide or its precursor, titanium oxides and titanates, chrome oxides, or any other material that will nucleate the transformation. The amount of nucleating agent, if used, is typically sufficient to effect the transformation of alpha alumina. Nucleating alpha alumina precursor dispersions is disclosed in U.S. Pat. No. 4,744,802 (Schwabel).

If a colloidal boehmite thickener is included in the slurry, a peptizing agent may be useful for providing stability. Suitable peptizing agents include monoprotic acids or acid compounds such as acetic acid, hydrochloric acid, formic acid, and nitric acid. Multiprotic acids can also be used but they may rapidly gel the slurry, making it difficult to handle or to introduce additional components thereto.

In some embodiments, the non-colloidal solid particles comprise alpha alumina particles. The alpha alumina particles may be, for example, crushed or shaped. As used herein, the term "alpha alumina particle" refers to a particle comprising alpha alumina. In some embodiments, the alpha alumina particles comprise at least 95 percent by weight or at least 99 percent by weight of alpha alumina. In some embodiments, the alpha alumina particles consist of alpha alumina Useful, alpha alumina particles may contain metal ions other than aluminum ions (e.g., $Fe^{3+}$ ions). Examples of suitable alpha aluminas include alpha alumina white fused alumina, and brown fused alumina, In some embodiments, the non-colloidal solid particles comprise alpha alumina precursor particles. As used herein, the term "alpha alumina precursor" refers to a material, other than alpha alumina, that can be at least partially (e.g., completely) converted to alpha alumina by sufficient heating. Examples of suitable alpha alumina precursors include, boehmite ($\gamma$-AlO(OH)), diaspore ($\alpha$-AlO(OH)), bayerite (i.e., $\alpha$-Al(OH)$_3$), and gibbsite and its polymorphs (e.g., doyleite and nordstrandite).

The non-colloidal solid particles may be monomodal or polymodal (e.g., bimodal). For example, the non-colloidal solid particles may have a bimodal distribution wherein about 95 percent of the non-colloidal solid particles may have mode of about 0.7 microns and about 5 percent of the non-colloidal solid particles have a mode of about 2-3 microns.

Advantageously, methods and shaped abrasive particles according to the present disclosure are tolerant of modest levels of sodium ions in the slurry components and resultant shaped abrasive particles, in contrast to traditional sol-gel methods in which even modest levels of sodium ions tend to markedly degrade abrasive properties of abrasive particles containing sodium ions. For example, good abrasive properties may be obtained even when the shaped abrasive particles contain, on an equivalent basis, up to about 2.5 by weight of sodium oxide, preferably from 0.03 to 2.5 percent by weight of sodium oxide, more preferably from 0.05 to 2.5 percent by weight of sodium oxide, based on the total weight of the shaped abrasive particles. In some embodiments, the shaped abrasive particles contain, on an equivalent basis, from 0.05 to 0.5 percent by weight of sodium oxide, based on the total weight of the shaped abrasive particles.

The liquid vehicle may comprise water and/or organic solvent. The liquid vehicle comprises water in an amount or at least 50, 60, 70, 80, 90, or even at least 95 percent by weight of the liquid vehicle. Preferably, any organic solvent in the liquid vehicle is water-soluble, more preferably water-miscible. Examples include lower alcohols (e.g., methanol, ethanol, propanol), ethers (e.g., glyme, and diglyme), and lactams (e.g., 2-pyrrolidone).

Preferably, the particles of alpha alumina and/or alpha alumina precursor included in the slurry have an average particle size in the range of from 0.4 to 2.0 microns, more preferably in the range of from 0.4 to 0.8 microns, although this is not a requirement. In some embodiments bimodal or even trimodal particle size distributions are useful. In this case in addition to fine particles, significantly larger size ones can be present (e.g. average particle size of 0.7 is complimented with few percents of 2-5 micron particles).

At least a portion of the slurry is next contacted with a substrate to form shaped bodies. This may be accomplished in at least several ways.

For example, the shaped bodies can also be made by molding the slurry using a production tool (i.e., mold) generally according to processes developed for sol-gel dispersions, except using the slurry instead of a sol-gel. In this method, the slurry is urged into (e.g., using a knife coater, bar coater, or doctor blade) precisely-shaped mold cavities on a major surface of the substrate, for example, as described in U.S. Patent Appin. Publ. Nos. 2010/0146867 A1 (Boden et al.); 2010/0151195 A1 (Culler et al.); 2010/0151196 A1 (Adefris et al.); 2009/0165394 A1 (Culler et al.); and 2010/0151201A1 (Erickson et al.). In this case, it is desirable the shaped bodies substantially retain the shape of the mold cavities, allowing for shrinkage during drying.

Suitable production tools can be, for example, a belt, a sheet, a continuous web, a coating roll such as a rotogravure roll, a sleeve mounted on a coating roll, or a die. In one embodiment, the production tool comprises polymeric material. Examples of suitable polymeric materials include thermoplastics such as polyesters, polycarbonates, poly(ether sulfone), poly(methyl methacrylate), polyurethanes, polyvinyl chloride, polyolefin, polystyrene, polypropylene, polyethylene or combinations thereof, or thermosetting materials. In one embodiment, the entire production tool is made from a polymeric or thermoplastic material.

A polymeric or thermoplastic production tool can be replicated off a metal master tool. The master tool will have the inverse pattern desired for the production tool. The master tool can be made in the same manner as the production tool. In one embodiment, the master tool is made out of metal, e.g., nickel and is diamond turned. In one embodiment, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

A scraper or leveler bar can be used to force the slurry fully into cavities in the production tool. The remaining portion of the slurry that does not enter a cavity can be removed from the top surface of the production tool and recycled. In some embodiments, a small portion of the slurry can remain on the top surface of the production tool, while in other embodiments the top surface is substantially free of the dispersion. The pressure applied by the scraper or leveler bar is typically less than 100 psi (0.6 MPa), less than 50 psi (0.3 MPa), or even less than 10 psi (60 kPa). In some embodiments, the slurry does not extend outwardly beyond the top surface. In those embodiments, wherein it is desired to have the exposed surfaces of the cavities result in planar faces of the shaped abrasive particles, it may be desirable to overfill the cavities (e.g., using a micronozzle array) and slowly dry the slurry Access to cavities in the production tool can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the ceramic shaped abrasive particles. The depth dimension is equal to the perpendicular distance from the top surface to the bottom surface. The depth of a given cavity can be uniform or can vary along its length and/or width. The cavities of a given mold can be of the same shape or of different shapes.

Alternatively, the slurry may be urged through openings in a screen or a perforated substrate (e.g., by screen printing). In this case, it is desirable that the slurry have sufficient viscosity that the shaped bodies substantially retain their shapes (allowing for shrinkage) during drying.

In either of these methods it may be desirable to include a mold release agent in the slurry, or to coat the mold release onto the mold surface, to aid in removing the shaped abrasive precursor particles from the substrate, if desired. Typical mold release agents include oils such as peanut oil or mineral oil, fish oil, silicones, polytetrafluoroethylene (ptfe), zinc stearate, and graphite. In general, a mold release agent such as peanut oil, in a liquid, such as water or alcohol, is applied to the surfaces of the production tooling in contact with the slurry such that between about 0.1 mg/in$^2$ (0.6 mg/cm$^2$) to about 3.0 mg/in$^2$ (20 m g/cm$^2$), or between about 0.1 mg/in$^2$ (0.6 mg/cm$^2$) to about 5.0 mg/in$^2$ (30 mg/cm$^2$) of the mold release agent is present when a mold release is desired.

The substrate may be, for example, in the form of a sheet, roll, belt, or web a belt, a sheet, a continuous web, a coating roll such as a rotogravure roll, or a sleeve mounted on a coating roll. The substrate may comprise metal (e.g. as in the case of a belt or roll) or an organic thickener (e.g., polyethylene or polypropylene).

After forming the slurry into shaped bodies, the shaped bodies are at least partially dried to provide shaped abrasive precursor particles. This may be accomplished, for example, using an oven, heated platen, heat gun, or infrared heater. As used herein, the term "drying" refers to removal of at least a portion of the liquid vehicle, which may or may not specifically refer to removal of water.

Desirably, the liquid vehicle is removed at a fast evaporation rate. In some embodiments, removal of the liquid vehicle by evaporation occurs at temperatures above the boiling point of the liquid vehicle. An upper limit to the drying temperature may depend on the material that the mold is made from. For polypropylene tooling, the temperature should generally be less than the melting point of polypropylene, preferably less than the softening point.

During drying, the slurry shrinks, which may cause retraction from the cavity walls. For example, if the cavities have planar walls, then the resulting ceramic shaped abrasive particles may tend to have at least three concave major sides. By making the cavity walls concave (whereby the cavity volume is increased) it is possible to obtain shaped abrasive particles that have at least three substantially planar major sides. The degree of concavity required generally depends on the solids content of the slurry.

Next, at least a portion of the shaped abrasive precursor particles are separated from the substrate. Typically, this may be accomplished, for example, by gravity, vacuum, pressurized air, or a mechanical method such as, for example, vibrating (e.g., ultrasonic vibration) flexing and/or beating, however other methods may also be used.

Once separated from the substrate, at least a portion of the shaped abrasive precursor particles are converted into shaped abrasive particles.

The shaped abrasive precursor particles can be further dried outside once separated from the substrate. If the slurry is dried to the desired level in the mold, this additional drying step is not necessary. However, in some instances it may be economical to employ this additional drying step to minimize the time that the slurry resides in the mold. Typically, the shaped abrasive precursor particles will be dried from 10 to 480 minutes, or from 120 to 400 minutes, at a temperature from 50° C. to 160° C., or at 120° C. to 150° C.

Optionally, but preferably, the shaped abrasive precursor particles are then calcined. During calcining, essentially all the volatile material is removed, and the various components that were present in the slurry are transformed into metal oxides. The shaped abrasive precursor particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, shaped abrasive precursor particles. Then the shaped abrasive precursor particles are pre-fired again. This option is further described in U.S. Pat. No. 5,164,348 (Wood).

Whether calcined or not, the shaped abrasive precursor particles (or calcined shaped abrasive precursor particles) are sintered to form shaped abrasive particles comprising alpha alumina. The shaped abrasive particles are typically ceramic after sintering. Prior to sintering, the (optionally calcined) shaped abrasive precursor particles are not completely densified and thus lack the desired hardness to be used as ceramic shaped abrasive particles. Sintering typically takes place by heating the (optionally calcined) shaped abrasive precursor particles to a temperature of from 1000° C. to 1650° C. The heating time required to achieve densification depends upon various factors, but times of from five seconds to 48 hours are typical.

In another embodiment, the duration for the sintering step ranges from one minute to 90 minutes. After sintering, the ceramic shaped abrasive particles can have a Vickers hardness of 10 GPa (gigapascal), 16 GPa, 18 GPa, 20 GPa, or greater.

Other steps can be used to modify the described process such as, for example, rapidly heating the material from the calcining temperature to the sintering temperature or centrifuging the slurry to remove sludge and/or waste. More-over, the process can be modified by combining two or more of the process steps if desired. Conventional process steps that can be used to modify the process of this disclosure are more fully described in U.S. Pat. No. 4,314,827 (Leitheiser).

Shaped abrasive particles prepared according to the present disclosure comprise alpha alumina having an average crystal grain size of 0.8 to 8 microns (preferably 0.8 to 6 microns, and more preferably 0.8 to 5 microns), and an apparent density that is at least 92, 93, 94, 95, 96, 97, 98, or even at least 99 percent of the true density (e.g., true density=3.97 g/cm$^3$ at 25° C. for alpha alumina).

Shaped abrasive particles according to the present disclosure may be used in a wide range of particle sizes, typically ranging in size from about 10 to about 10000 microns; preferably from about 100 to about 10000 microns, more preferably from about 500 to about 10000 microns, although this is not a requirement. In some embodiments, the shaped abrasive particles have an average particle size of at least 20 U.S. mesh (i.e., ≥ about 840 microns). Shaped abrasive particles according to the present disclosure can be screened and graded using techniques well known in the art, including the use of an abrasives industry recognized grading standards such as ANSI (American National Standard Institute), FEPA (Federation of European Producers of Abrasives), and JIS (Japanese Industrial Standard). ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JI58, JI512, JI516, JI524, JI536, JI546, JI554, JI560, JI580, JIS100, JIS150, JI5180, JI5220, JI5240, JI5280, JI5320, JI5360, JI5400, JI5400, JI5600, JI5800, JIS1000, JIS1500, JI52500, JI54000, JI56000, JI58000, and JIS10,000.

Shaped abrasive particles according to the present disclosure have non-random shapes, generally imparted by the method used to form them. For example, shaped abrasive particles may be shaped as pyramids, truncated pyramids, rods, or cones. In some embodiments, the shaped abrasive particles have outer surface comprising a plurality of side walls that form at least four vertexes. The side walls are typically substantially smooth or smooth, although this is not a requirement.

In some embodiments, each of the shaped abrasive particles may comprise a bottom surface abutting a plurality of side walls, wherein the bottom surface comprises at least three vertexes.

In some embodiments, each of the shaped abrasive particles may further comprise a respective top surface abutting the plurality of side walls, wherein the top surface and the bottom surface do not contact each other. In some embodiments, the side walls taper inward from the bottom surface.

Referring now to FIG. 1, exemplary shaped abrasive particle 100 according to the present disclosure comprises a truncated trigonal pyramid with vertexes 110, side walls 120, edges 130, bottom surface 140, and top surface 150 (which does not contact bottom surface 140). Side walls 120 taper inward from bottom surface 140. Adjacent sidewalls contact each other at an edge 130 and at least two vertexes 110.

In another aspect, the present disclosure provides abrasive articles (e.g., coated abrasive articles, bonded abrasive articles (including vitrified, resinoid, and metal-bonded grinding wheels, cut-off wheels, mounted points, and honing stones), nonwoven abrasive articles, and abrasive brushes) comprising a binder and shaped abrasive particles according to the present disclosure retained in the binder. Methods of making such abrasive articles and using abrasive articles are well known to those skilled in the art. Additionally, shaped abrasive particles according to the present disclosure can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. Examples of suitable backing materials include woven fabric, polymeric film, vulcanized fiber, a nonwoven fabric, a knit fabric, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An exemplary embodiment of a coated abrasive article according to the present disclosure is depicted in FIG. 2. Referring to FIG. 2, coated abrasive article 200 has a backing 220 and abrasive layer 230. Abrasive layer 230 includes shaped abrasive particles 240 according to the present disclosure secured to major surface 270 of backing 220 (substrate) by make coat 250 and size coat 260. Shaped abrasive particles 240 contact make coat 250. Size coat 260 is disposed on at least a portion of make coat 250 and at least a portion of shaped abrasive particles 240. Each of make coat 250 and size coat 260 comprise a respective binder which may be the same or different.

Another exemplary coated abrasive article according to the present disclosure is depicted in FIG. 3. Referring to FIG. 3, exemplary coated abrasive article 300 has a backing 320 (substrate) and structured abrasive layer 330. Structured abrasive layer 330 includes a plurality of shaped abrasive composites 335 comprising shaped abrasive particles 340 according to the present disclosure dispersed in a binder 350 secured to a major surface 370 of backing 320.

Coated abrasive articles according to the present disclosure may include additional layers such as, for example, an optional supersize layer that is superimposed on the abrasive layer, or an antistatic treatment and/or layer may also disposed on the backing opposite the abrasive layer, if desired.

Details regarding coated abrasive articles and methods for their manufacture can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Bonded abrasive articles typically include a shaped mass of abrasive particles (which comprise shaped abrasive particles according to the present disclosure and optionally crushed abrasive particles) held together by an organic, metallic, or vitrified binder. Such shaped mass can be, for example, in the form of a wheel, such as a grinding wheel or cutoff wheel. The diameter of grinding wheels typically is about one cm to over one meter; the diameter of cut off wheels about one cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3 to 50 percent by volume of bond material, about 30 to 90 percent by volume abrasive particles (or abrasive particle blends), up to 50 percent by volume additives (including grinding aids), and up to 70 percent by volume pores, based on the total volume of the bonded abrasive article.

An exemplary form is a grinding wheel. Referring to FIG. 4, grinding wheel 400 according to the present disclosure includes shaped abrasive particles 440 according to the present disclosure, retained by a binder 430, molded into a wheel, and mounted on hub 420.

Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.); U.S. Pat. No. 4,997,461 (Markhoff-Matheny et al.); U.S. Pat. No. 5,037,453 (Narayanan et al.); and U.S. Pat. No. 5,863,308 (Qi et al.).

Nonwoven abrasive articles typically include an open porous lofty polymer filament structure having abrasive particles according to the present disclosure distributed throughout the structure and adherently bonded therein by an organic binder. Examples of filaments include polyester fibers, polyamide fibers, and polyaramid fibers. In FIG. 5, a schematic depiction, enlarged about 100×, of an exemplary nonwoven abrasive article 500 according to the present disclosure is provided. Such a nonwoven abrasive article according to the present disclosure comprises a lofty open nonwoven fiber web 550 (substrate) onto which shaped abrasive particles 540 according to the present disclosure are adhered by binder material 560.

Details regarding nonwoven abrasive articles and methods for their manufacture can be found, for example, in U.S. Pat. No. 2,958,593 (Hoover et al.); U.S. Pat. No. 4,227,350 (Fitzer); U.S. Pat. No. 4,991,362 (Heyer et al.); U.S. Pat. No. 5,712,210 (Windisch et al.); U.S. Pat. No. 5,591,239 (Edblom et al.); U.S. Pat. No. 5,681,361 (Sanders); U.S. Pat. No. 5,858,140 (Berger et al.); U.S. Pat. No. 5,928,070 (Lux); and U.S. Pat. No. 6,017,831 (Beardsley et al.).

Details regarding abrasive brushes and methods for their manufacture can be found, for example, abrasive brushes include those having a plurality of bristles unitary with a backing (see, e.g., U.S. Pat. No. 5,443,906 (Pihl et al.); U.S. Pat. No. 5,679,067 (Johnson et al.); and U.S. Pat. No. 5,903,951 (Ionta et al.). Preferably, such brushes are made by injection molding a mixture of polymer and abrasive particles.

Suitable binders (i.e., binder materials) include organic binders such as, for example, thermosetting organic binders. Examples of suitable thermosetting organic binders include phenolic resins, urea-formaldehyde resins, melamine-formaldehyde resins, urethane resins, acrylate resins, polyester resins, aminoplast resins having pendant alpha, beta-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, or graphite), coupling agents (e.g., silanes, titanates, or zircoaluminates), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

More specifically, with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present disclosure may be in the shape of a wheel, honing stone, mounted pointed or other conventional bonded abrasive shape. An exemplary vitrified bonded abrasive article according to the present disclosure is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100 percent by weight of glass frit, although more typically the composition comprises 20 to 80 percent by weight of glass frit, or 30 to 70 percent by weight of glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials may include those comprising silica, alumina (preferably, at least 10 percent by weight alumina), and boria (preferably, at least 10 percent by weight boria). In most cases the vitrified bonding material further comprises alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and/or physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. A combination of different grinding aids may be used, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles is about 50 to 300 grams per square meter ($g/m^2$), preferably about 80 to 160 $g/m^2$. In vitrified bonded abrasive articles grinding aid is typically impregnated into the pores of the article.

The abrasive articles can contain 100 percent shaped abrasive particles according to the present disclosure, or blends of such abrasive particles with other abrasive particles and/or diluent particles. However, at least about 2 percent by weight, preferably at least about 5 percent by weight, and more preferably about 30 to 100 percent by weight, of the abrasive particles in the abrasive articles should be shaped abrasive particles according to the present disclosure.

In some instances, the shaped abrasive particles according the present disclosure may be blended with other abrasive particles and/or diluent particles at a ratio between 5 and 75 percent by weight, about 25 to 75 percent by weight about 40 to 60 percent by weight, or about 50 to 50 percent by weight (i.e., in equal amounts by weight).

Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The conventional sol-gel-derived abrasive particles may be seeded or non-seeded. Likewise, they may be randomly shaped or have a shape associated with them, such as a rod or a triangle. In some instances, blends of abrasive particles may result in an abrasive article that exhibits improved grinding performance in comparison with abrasive articles comprising 100 percent of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present disclosure, with the smaller sized particles being another abrasive particle type. Conversely, for example, the smaller sized abrasive particles may be abrasive particles according to the present disclosure, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads, and diluent agglomerates.

Shaped abrasive particles according to the present disclosure can also be combined in or with abrasive agglomerates. Abrasive agglomerate particles typically comprise a plurality of abrasive particles, a binder, and optional additives. The binder may be organic and/or inorganic. Abrasive agglomerates may be randomly shaped or have a predetermined shape associated with them. The shape may be, for example, a block, cylinder, pyramid, coin, or a square. Abrasive agglomerate particles typically have particle sizes ranging from about 100 to about 5000 microns, typically about 250 to about 2500 microns.

The abrasive particles may be uniformly distributed in the abrasive article or concentrated in selected areas or portions of an abrasive article. For example, in a coated abrasive, there may be two layers of abrasive particles. The first layer comprises abrasive particles other than shaped abrasive particles according to the present disclosure, and the second (outermost) layer comprises shaped abrasive particles according to the present disclosure. Likewise in a bonded abrasive, there may be two distinct sections of the grinding wheel. The outermost section may comprise shaped abrasive particles according to the present disclosure, whereas the innermost section does not. Alternatively, shaped abrasive particles according to the present disclosure may be uniformly distributed throughout the bonded abrasive article.

The present disclosure provides a method of abrading a workpiece. The method comprises: frictionally contacting abrasive particles according to the present disclosure with a surface of the workpiece, and moving at least one of the abrasive particles and the surface of the workpiece relative to the other to abrade at least a portion of the surface of the workpiece. Methods for abrading with abrasive particles according to the present disclosure include, for example, snagging (i.e., high-pressure high stock removal) to polishing (e.g., polishing medical implants with coated abrasive belts), wherein the latter is typically done with finer grades (e.g., ANSI 220 and finer) of abrasive particles. The abrasive particles may also be used in precision abrading applications such as grinding cam shafts with vitrified bonded wheels. The size of the abrasive particles used for a particular abrading application will be apparent to those skilled in the art.

Abrading may be carried out dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Examples of workpieces include aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms (kg), although other pressures can also be used.

SELECT EMBODIMENTS OF THE PRESENT DISCLOSURE

In a first embodiment, the present disclosure provides a method of making abrasive particles, the method comprising:

providing a slurry comprising non-colloidal solid particles and a liquid vehicle, wherein at least some of the non-colloidal solid particles comprise at least one of alpha alumina or an alpha alumina precursor, and wherein the non-colloidal solid particles comprise at least 30 percent by volume of the slurry;

forming at least a portion of the slurry into shaped bodies contacting a substrate, wherein the shaped bodies are formed substantially according to a predetermined shape;

at least partially drying the shaped bodies to provide shaped abrasive precursor particles;

separating at least a portion of the shaped abrasive precursor particles from the substrate; and converting at least a portion of the shaped abrasive precursor particles into shaped abrasive particles, wherein the shaped abrasive particles comprise alpha alumina, wherein the alpha alumina has an average crystal grain size of 0.8 to 8 microns and an apparent density that is at least 92 percent of the true density, and wherein each of the shaped abrasive particles has a respective surface comprising a plurality of sides and at least four vertexes.

In a second embodiment, the present disclosure provides a method according to the first embodiment, wherein the substrate has cavities on a surface thereof, and wherein said forming the slurry into shaped abrasive precursor particles contacting the substrate comprises urging the slurry into at least a portion of the cavities.

In a third embodiment, the present disclosure provides a method according to the first or second embodiment, wherein said shaping the slurry comprises urging the slurry through a screen onto the substrate.

In a fourth embodiment, the present disclosure provides a method according to any one of the first to third embodiments, wherein the non-colloidal alpha alumina precursor particles contain, on an equivalent basis, at least 0.03 percent by weight of sodium oxide, based on the total weight of the shaped abrasive precursor particles.

In a fifth embodiment, the present disclosure provides a method according to any one of the first to fourth embodiments, wherein said converting at least a portion of the shaped abrasive precursor particles into the shaped abrasive particles comprises:

sintering the shaped abrasive precursor particles to provide the shaped abrasive particles.

In a sixth embodiment, the present disclosure provides a method according to any one of the first to fourth embodiments, wherein said converting at least a portion of the shaped abrasive precursor particles into the shaped abrasive particles comprises:

calcining the shaped abrasive precursor particles to provide calcined shaped abrasive precursor particles; and sintering the calcined shaped abrasive precursor particles to provide the shaped abrasive particles.

In a seventh embodiment, the present disclosure provides a method according to any one of the first to sixth embodiments, wherein said converting at least a portion of the shaped abrasive precursor particles into the shaped abrasive particles comprises:

impregnating the shaped abrasive precursor particles with a metal salt solution to provide impregnated shaped abrasive precursor particles; and sintering the impregnated shaped abrasive precursor particles to provide the shaped abrasive particles.

In an eighth embodiment, the present disclosure provides a method according to any one of the first to sixth embodiments, wherein said converting at least a portion of the shaped abrasive precursor particles into the shaped abrasive particles comprises:

calcining the shaped abrasive precursor particles to provide calcined shaped abrasive precursor particles;

impregnating the calcined shaped abrasive precursor particles with a metal salt solution to provide impregnated calcined shaped abrasive precursor particles; and sintering the impregnated calcined shaped abrasive precursor particles to provide the shaped abrasive particles.

In a ninth embodiment, the present disclosure provides a method according to any one of the first to eighth embodiments, wherein the non-colloidal alpha alumina precursor particles comprise aluminum oxide powder.

In a tenth embodiment, the present disclosure provides a method according to any one of the first to ninth embodiments, wherein the non-colloidal alpha alumina precursor particles comprise milled aluminum trihydrate particles.

In an eleventh embodiment, the present disclosure provides a method according to any one of the first to tenth embodiments, wherein the non-colloidal alpha alumina precursor particles contain, on an equivalent basis, 0.03 to 0.25 percent of sodium oxide based on the total weight of the shaped abrasive precursor particles.

In a twelfth embodiment, the present disclosure provides a method according to any one of the first to eleventh embodiments, wherein the non-colloidal alpha alumina precursor particles have an average particle diameter of at least 0.2 microns.

In a thirteenth embodiment, the present disclosure provides a method according to any one of the first to twelfth embodiments, wherein the slurry further comprises a thickener.

In a fourteenth embodiment, the present disclosure provides a method according to the twelfth embodiment, wherein the thickener comprises colloidal boehmite.

In a fifteenth embodiment, the present disclosure provides a method according to the twelfth embodiment, wherein the thickener comprises an organic thickener.

In a sixteenth embodiment, the present disclosure provides a method according to any one of the first to fifteenth embodiments, wherein the shaped abrasive particles have an average particle size of greater than 20 mesh.

In a seventeenth embodiment, the present disclosure provides a method according to any one of the first to sixteenth embodiments, wherein the non-colloidal alpha alumina precursor particles comprise at least 40 percent by volume of the slurry.

In an eighteenth embodiment, the present disclosure provides shaped abrasive particles made according to a method of any one of the first to seventeenth embodiments.

In a nineteenth embodiment, the present disclosure provides an abrasive article comprising shaped abrasive particles according to the eighteenth embodiment, retained in a binder, wherein the shaped abrasive particles comprising alpha alumina, wherein the alpha alumina has an average crystal grain size of from 0.8 to 8 microns, wherein the alpha alumina has an apparent density that is at least 92 percent of the true density, and wherein the shaped abrasive particles conform to a nominal predetermined shape.

In a twentieth embodiment, the present disclosure provides an abrasive article according to the nineteenth embodiment, wherein the abrasive article further comprises:

a backing;

a make coat secured to a major surface of the backing, wherein the shaped abrasive particles contact the make coat; and a size coat disposed on at least a portion of the make coat and at least a portion of the shaped abrasive particles.

In a twenty-first embodiment, the present disclosure provides an abrasive article comprising shaped abrasive particles according to the nineteenth or twentieth embodiment, wherein the abrasive article further comprises a backing and an abrasive layer in contact with a major surface of the backing, wherein the abrasive layer comprises the binder and the shaped abrasive particles.

In a twenty-second embodiment, the present disclosure provides an abrasive article comprising shaped abrasive particles according to the nineteenth embodiment, wherein the abrasive article, wherein the abrasive article further comprises a lofty open fiber web.

In a twenty-third embodiment, the present disclosure provides an abrasive article comprising shaped abrasive particles according to the nineteenth embodiment, wherein the abrasive article comprises a bonded abrasive wheel.

In a twenty-fourth embodiment, the present disclosure provides a method of abrading a workpiece, the method comprising contacting at least one shaped abrasive particle contained in the abrasive article of any one of the nineteenth to twenty-third with a workpiece, and moving at least one of abrasive article or the workpiece relative to the other to abrade at least a portion of the workpiece.

In a twenty-fifth embodiment, the present disclosure provides shaped abrasive particles comprising alpha alumina, wherein the alpha alumina has an average crystal grain size of 0.8 to 8 microns, wherein the alpha alumina has an apparent density that is at least 92 percent of the true density, wherein each of the shaped abrasive particles has a respective surface comprising a plurality of sides and at least four vertexes, and wherein the shaped abrasive particles conform to a nominal predetermined shape.

In a twenty-sixth embodiment, the present disclosure provides shaped abrasive particles according to the twenty-fifth embodiment, wherein each respective surface further comprises at least four edges, wherein the average width of each edge ranges from about 5 to 20 microns and the ratio of the average width of each edge to the average crystal grain size is in a range of from 1 to 25.

In a twenty-seventh embodiment, the present disclosure provides shaped abrasive particles according to the twenty-fifth or twenty-sixth embodiment, wherein each of the shaped abrasive particles respectively comprises a bottom surface abutting a plurality of side walls, wherein the bottom surface comprises at least three vertexes.

In a twenty-eighth embodiment, the present disclosure provides shaped abrasive particles according to the twenty-seventh embodiment, wherein each of the shaped abrasive particles further comprises a respective top surface abutting the plurality of side walls, wherein the top surface and the bottom surface do not contact each other.

In a twenty-ninth embodiment, the present disclosure provides shaped abrasive particles according to the twenty-seventh or twenty-eighth embodiment, wherein the side walls taper inward from the bottom surface.

In a thirtieth embodiment, the present disclosure provides shaped abrasive particles according to any one of the twenty-fifth to twenty-ninth embodiments, wherein the shaped abrasive particles contain on an equivalent basis at least 0.03 percent by weight of sodium oxide, based on the total weight of the shaped abrasive particles.

In a thirty-first embodiment, the present disclosure provides shaped abrasive particles according to any one of the twenty-fifth to twenty-ninth embodiments, wherein the shaped abrasive particles contain 0.03 to 0.25 percent of sodium oxide based on the total weight of the shaped abrasive particles.

In a thirty-second embodiment, the present disclosure provides shaped abrasive particles according to any one of the twenty-fifth to thirty-first embodiments, wherein the shaped abrasive particles have an average particle size that conforms to a U.S. mesh size in the range of from 6 to 80.

In a thirty-third embodiment, the present disclosure provides an abrasive article comprising shaped abrasive particles retained in a binder, wherein the shaped abrasive particles comprising alpha alumina, wherein the alpha alumina has an average crystal grain size of from 0.8 to 8 microns, wherein the alpha alumina has an apparent density that is at least 92 percent of the true density, and wherein the shaped abrasive particles conform to a nominal predetermined shape.

In a thirty-fourth embodiment, the present disclosure provides an abrasive article according to the thirty-third embodiment, wherein the abrasive article further comprises:
a backing;
a make coat secured to a major surface of the backing, wherein the shaped abrasive particles contact the make coat; and
a size coat disposed on at least a portion of the make coat and at least a portion of the shaped abrasive particles.

In a thirty-fifth embodiment, the present disclosure provides an abrasive article according to the thirty-third embodiment, wherein the abrasive article further comprises a backing and an abrasive layer in contact with a major surface of the backing, wherein the abrasive layer comprises the binder and the shaped abrasive particles.

In a thirty-sixth embodiment, the present disclosure provides an abrasive article according to the thirty-third embodiment, wherein the abrasive article further comprises a lofty open fiber web.

In a thirty-seventh embodiment, the present disclosure provides an abrasive article according to the thirty-third embodiment, wherein the abrasive article comprises a bonded abrasive wheel.

In a thirty-eighth embodiment, the present disclosure provides a method of abrading a workpiece, the method comprising contacting an abrasive article according to any one of the thirty-third to thirty-seventh embodiments with the workpiece, and moving at least one of abrasive article or the workpiece relative to the other to abrade at least a portion of the workpiece.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples are by weight.

Examples 1-7

A polyethylene-lined ball-mill jar was charged with 100 grams (g) of deionized water, 0.5 g of ammonium citrate dispersant agent, 400 g of various aluminum oxide powders (as reported in Table 1, with sources of the raw materials reported in Table 2). About 700 grams of alumina milling media (10 mm diameter; 99.9% alumina; obtained from Union Process, Akron, Ohio) were added to the bottle, and the mixture was milled at 120 rpm for 24 hours. After milling, the milling media was removed and the slurry was degassed by placing it into a desiccator jar and applying a vacuum using mechanical pump (about 10 minutes hold under vacuum). The resulting slurry was poured onto a polyethylene sheet containing replicated pattern of triangular truncated pyramids with about 0.4 mm side length, 0.1 mm in depth, having a topical coating of mineral oil deposited by drying from a 5 weight percent ethanol solution. The slurry was spread to cover an approximate area of 400 cm² of the sheet using a squeegee. The sheet containing the ceramic slurry was then dried under a heat gun. Following drying the sheet was vigorously shaken to dislodge the resulting shaped abrasive precursor particles which now were in the shape of triangular truncated pyramids.

The shaped abrasive precursor particles were calcined by placing them in an alumina crucible and heating to 700° C. (heating rate 10° C./min) in air. No isothermal hold was applied. The particles remained as pyramids after this step and were strong enough to withstand additional handling.

About 300 g of the calcined shaped abrasive precursor particles were placed in an alumina crucible and sintered in a Model KKSK-666-3100 electrically heated furnace from Keith Furnaces of Pico Rivera, Calif., using a heating rate of 25° C./min and a hold time of 45 min at the final temperature which is shown in Table 1.

The densities of the resultant sintered shaped abrasive particles were measured with the use of an ACCUPYC II 1330 pycnometer from Micromeritics Instrument Corporation, Norcross, Ga., according to standard operating procedure. The results are documented in Table 1.

The average crystal size was determined by the line intercept method according to test method ASTM E112-96 "Standard Test Methods for Determining Average Grain Size". Approximately 5 g of shaped abrasive particles were placed in a plastic bag and crushed with a hammer to generate fractured particles. The resulting mix of fractured and non-fractured shaped abrasive particles was mounted onto a stage, coated with a thin layer of gold-palladium and viewed using a JEOL Model 7600F scanning electron microscope (SEM). A typical SEM micrograph of the microstructure found in the sample was used to determine the average crystal size as follows (e.g., see FIG. 6 which shows an SEM micrograph of a fracture surface of shaped abrasive particles of Example 5). The number of crystals that intersected per unit length ($N_L$) of a random line were drawn across the micrograph was counted. The average crystal size was determined from this number using the following equation:

$$\text{Average Crystal Size} = \frac{1.5}{N_L M}$$

wherein $N_L$ is the number of crystals intersected per unit length and M is the magnification of the micrograph. The average crystal size in the sample is reported in the Table 1, below.

TABLE 1

| EXAMPLE | POWDER SOURCE | Na₂O CONTENT, weight percent | HIGHEST FIRING TEMPERATURE, ° C. | AVERAGE CRYSTAL GRAIN SIZE SIZE, microns | APPARENT DENSITY (percent of true density) |
|---|---|---|---|---|---|
| 1 | APA-0.5 | 0.001 | 1425 | 2.1 | 98.1 |
| 2 | P172SB | 0.05 | 1495 | 3.4 | 97.1 |
| 3 | CT3000LS | 0.03 | 1475 | 2.7 | 97.7 |
| 4 | CT3000SG | 0.08 | 1495 | 2.9 | 97.6 |
| 5 | A1000SG | 0.07 | 1495 | 3.7 | 97.2 |
| 6 | RG4000 | 0.08 | 1495 | 3.9 | 97.3 |
| 7 | TM-DAR | 0.0008 | 1380 | 1.1 | 98.8 |

TABLE 2

| RAW MATERIAL | SOURCE |
|---|---|
| APA-0.15 | Ceralox Divison of Sasol North America Inc., Tucson, Arizona |
| P172SB | Rio Tinto Alcan, Montreal, Quebec, Canada |
| CT3000LS | Almatis Inc., Bauxite, Arkansas |
| CT3000SG | Almatis Inc. |
| A1000SG | Almatis Inc. |
| RG4000 | Almatis Inc. |
| TM-DAR | Taimei Chemical Co. Ltd, Japan |

Grinding Performance of Examples 1-7 and Comparative Examples A-C

About 17 grams of the resulting shaped abrasive particles were incorporated into a coated abrasive disc. The coated abrasive disc was made according to conventional procedures. The shaped abrasive particles were bonded to 17.8 cm diameter, 0.8 mm thick vulcanized fiber backings (having a 2.2 cm diameter center hole) using a conventional calcium carbonate-filled phenolic make resin (48% resole phenolic resin, 52% calcium carbonate, diluted to 81% solids with water and glycol ether) and a conventional cryolite-filled phenolic size resin (32% resole phenolic resin, 2% iron oxide, 66% cryolite, diluted to 78% solids with water and glycol ether). The wet make resin weight was about 185 g/m². Immediately after the make coat was applied, the shaped abrasive particles were electrostatically coated. The make resin was heated for 120 minutes at 88° C. Then, the cryolite-filled phenolic size coat was coated over the make coat and abrasive particles. The wet size weight was about 850 g/m². The size resin was heated for 12 hours at 99° C. The coated abrasive disc was flexed prior to testing.

Comparative Example A coated abrasive discs were prepared as described for Example 1 (above), except that heat-treated fused alumina abrasive particles (obtained as ALODUR BFRPL, grade 36 from Treibacher, Villach, Austria were used in place of the Example 1 shaped abrasive particles.

Comparative Example B coated abrasive discs were prepared as described for Example 6 (above), except that grade 36 alumina-zirconia abrasive particles (having a eutectic composition of 60% Al₂O₃ and 39% ZrO₂; obtained as NORZON from Norton Company, Worcester, Mass.) were used in place of the Example 1 shaped abrasive particles.

Comparative Example C coated abrasive discs were prepared as described above except conventionally crushed sol-gel-derived abrasive particles (marketed as 3M CERAMIC ABRASIVE GRAIN 321 from the 3M Company, St. Paul, Minn.) was used in place of the Example 1 shaped abrasive particles.

Comparative Example D coated abrasive discs were prepared as described above except random shape abrasive particles prepared by pan-drying of slurry of Example 1 material, sintering and crushing to provide grade 36 cut were used in place of the Example 1 shaped abrasive particles.

The grinding performance of Examples 1-7 and Comparative Examples A-D coated abrasive discs were evaluated as follows. Each coated abrasive disc was mounted on a beveled aluminum back-up pad, and used to grind the face of a pre-weighed 1.25 cm×18 cm×10 cm 1018 mild steel workpiece. The disc was driven at 5,000 revolutions per minute (rpm) while the portion of the disc overlaying the beveled edge of the back-up pad contacted the workpiece at a load of 8.6 kilograms. Each disc was used to grind an individual workpiece in sequence for one-minute intervals. The total cut was the sum of the amount of material removed from the workpiece throughout the test period. The total cut by each sample after 12 minutes of grinding are reported in Table 3, below, wherein an average cut from of two discs is reported.

TABLE 3

| EXAMPLE | TOTAL CUT, grams |
|---|---|
| 1 | 998 |
| 2 | 1050 |
| 3 | 1075 |
| 4 | 1067 |
| 5 | 1113 |
| 6 | 1078 |
| 7 | 977 |
| Comp. Ex. A | 226 |
| Comp. Ex. B | 496 |
| Comp. Ex. C | 515 |
| Comp. Ex. D | 456 |

Examples 8A Through 8F

Shaped abrasive particles of Examples 8a-8e were prepared as described in Example 2, except that the procedure was repeated several times to generate larger quantity of material. Sintered shaped particles were subsequently subjected to grain growth inducing heat-treatments which included a ramp rate of 25° C./min from room temperature to the highest firing temperature (reported in Table 4). Examples 8a through 8e materials differ by the highest firing temperature used for the heat treatment.

Example 8f material was prepared as described in Example 2, except the proportion of water and alumina powder was changed to 100 g and 200 g respectively. This change yielded a more fluid slurry that, when dried on a replicated sheet, produced shaped abrasive particles with less sharp edges. Average grain size and grinding characteristics were analyzed as described for Example 2.

Edge Microstructural Sharpness (EMS), was measured for all of the shaped abrasive particles produced in these Examples. This parameter can be obtained with a use of a standard SEM observation according to the following procedure. Approximately 1 gram of shaped abrasive particles was mounted onto a stage, coated with a thin layer of gold-palladium and viewed using a JEOL Model 7600F scanning electron microscope (SEM). Typical SEM micrographs of the shaped abrasive grain corner and edge are shown in FIGS. 7 and 8, respectively.

Figure 9:
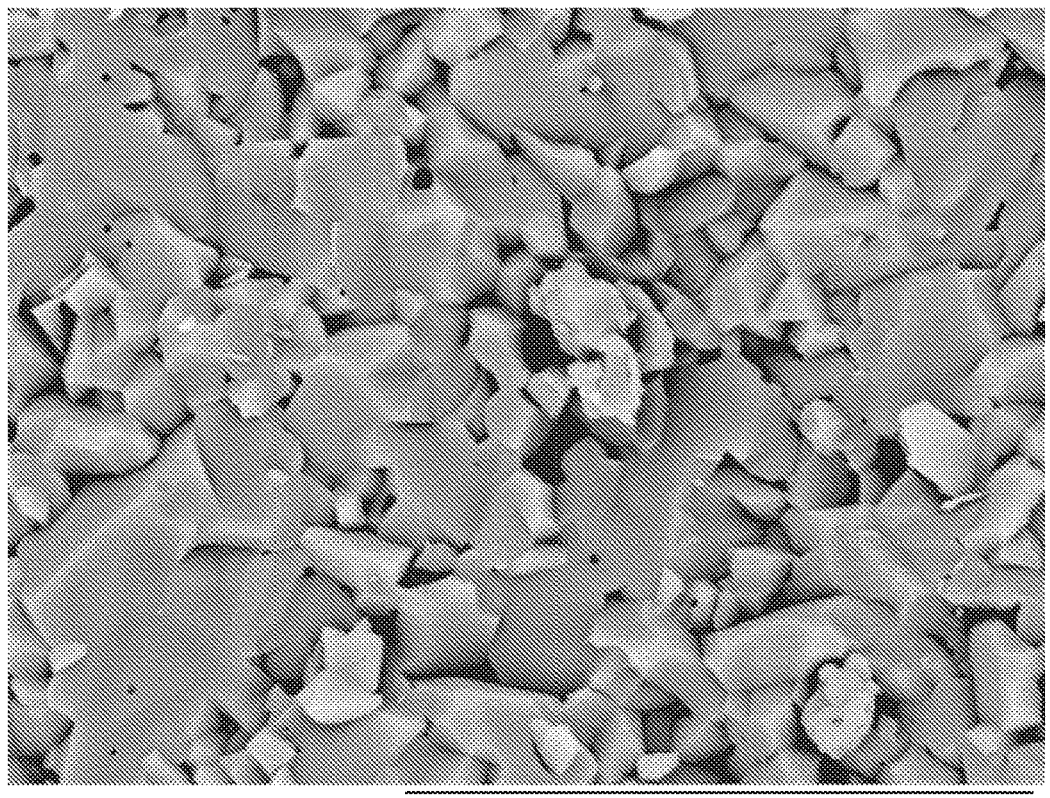
FIG. 9 is an SEM micrograph of a fracture surface of shaped abrasive particles of Example 8c.
Figure 10:
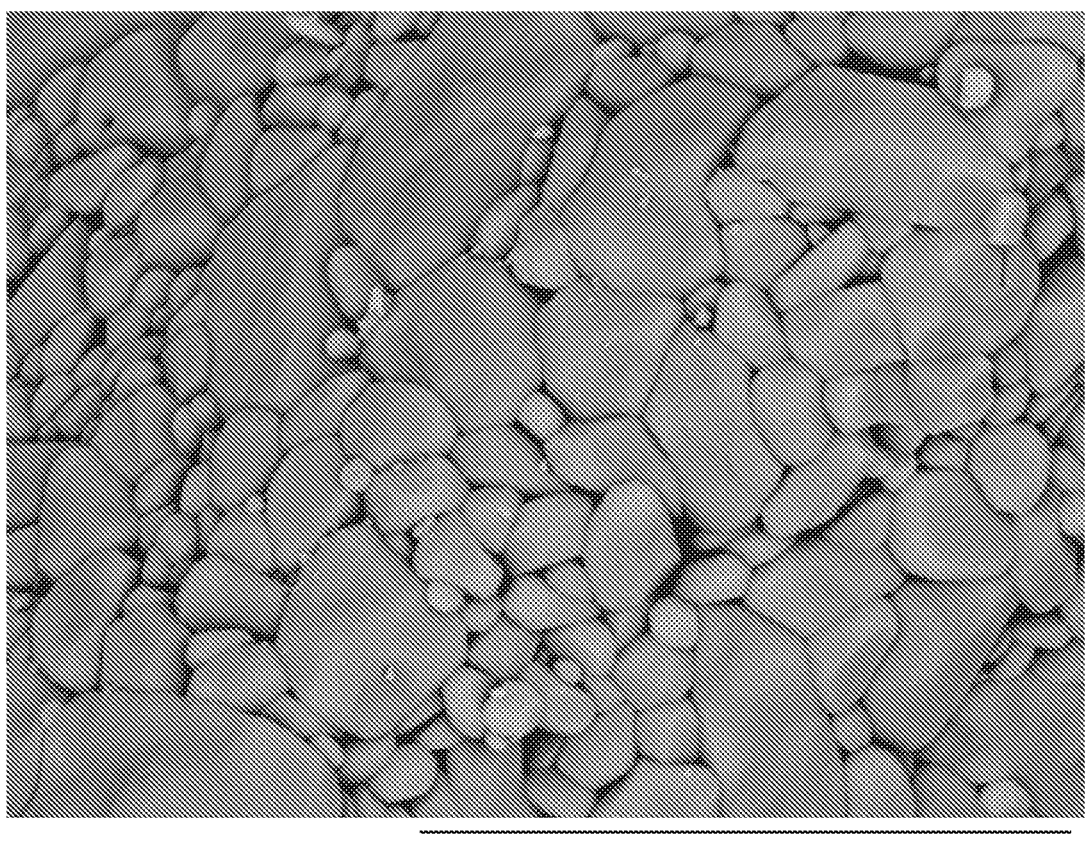
FIG. 10 is an SEM micrograph of a fracture surface of shaped abrasive particles of Example 8e.

Crystal grain size of the material is obtained as described above (see also FIGS. 9 and 10). Referring to FIG. 7, edge width is 12.8 microns and the average crystal grain size is around 7.5 microns. EMS is defined herein as a ratio of the average edge width to the average crystal grain size at the edge. Thus the edge microstructural sharpness is around 1.7.

The EMS of shaped abrasive particles from Example 7 is shown in Table 4, wherein the average of six measurements along the edge is reported. Referring to Table 4, good grinding characteristics generally correlate with higher EMS numbers, unless the initial edge width is too high. Independent of crystal grain size, initial edge width is set during processing procedure in which slurry is replicated into a triangular pattern. For each of Examples 8a-8e the initial edge width was measured at around 9.3 microns. In example 8f, however, the initial edge width was about 13.8 microns resulting in a decrease of grinding characteristics. Ultimately for good grinding performance shaped abrasive grain should have edge widths lower than about 15-20 microns, preferably as low as 12, 10 or even 8 microns and EMS parameter should be higher than 1, preferably higher than 1.5 or even 2.

TABLE 4

| EXAMPLE | HIGHEST FIRING TEMPERATURE, ° C. | AVERAGE CRYSTAL GRAIN SIZE, microns | EMS | TOTAL CUT, grams |
|---|---|---|---|---|
| 8A | 1505 | 3.6 | 2.58 | 967 |
| 8B | 1515 | 3.9 | 2.42 | 899 |
| 8C | 1530 | 4.9 | 1.99 | 843 |
| 8D | 1550 | 6.7 | 1.87 | 711 |
| 8E | 1650 | 9.8 | 1.2 | 103 |
| 8F | 1495 | 3.4 | 4.05 | 565 |

Examples 9-13

Examples 9-13 were prepared as described in Example 1, except that various sintering additives were introduced to promote densification at lower temperatures. The sintering additives and lowest firing temperature necessary to achieve 96% of theoretical density are summarized in Table 5, below.

TABLE 5

| EXAMPLE | SINTERING ADDITIVES | HIGHEST FIRING TEMPERATURE, ° C. |
|---|---|---|
| 9 | $Fe_2O_3$, 1.5 wt. % $TiO_2$, 0.5 wt. % $SiO_2$, 1.5 wt. % | 1380 |
| 10 | $Fe_2O_3$, 1.5 wt. % $TiO_2$, 0.5 wt. % | 1380 |
| 11 | Kaolinite (Form 100), 2 wt. % | 1450 |
| 12 | $MnO_2$, 1.5 wt. % $TiO_2$, 0.5 wt. % | 1390 |
| 13 | MgO, 4 wt. % (introduced as $Mg(NO_3)_2 \cdot 6H_2O$) | 1470 |

Example 14

A Teflon-lined attritor-mill jar was charged with 250 g of deionized water, 4 g of nitric acid (70% concentration), 190 g of aluminum hydroxide SH-20 (obtained from Dadco Aluminium and Chemicals, Lausanne, Switzerland). This powder contained about 0.25 wt. % of Na2O. About 700 grams of alumina milling media (5 mm diameter; 99.9% alumina; obtained from Union Process) were added to the jar, and the mixture was milled at 500 rpm for 24 hours. After milling, the milling media was removed, and 31 g of magnesium nitrate hydroxide $(Mg(NO_3)_2 \cdot 6H_2O$, from Sigma-Aldrich Co., Saint Louis, Mo., was added to the slurry, and homogenized with the aid of a air-driven stirring setup. The resulting slurry was poured onto a polyethylene sheet containing replicated pattern of triangular truncated pyramids with about 0.4 mm side length, 0.1 mm in depth, having a topical coating of mineral oil deposited from a dried 5% ethanol solution and spread to cover an approximate area of 400 cm² of the sheet using a squeegee. The sheet containing slurry was then dried under a heat gun. Following drying, the web was vigorously shaken to dislodge dried shaped abrasive precursor particles, which now were in the shape of triangular truncated pyramids.

The shaped abrasive precursor particles were calcined by placing them in an alumina crucible and heating to 800° C. (heating rate 10° C./min) in air. No isothermal hold was applied. The particles remained as pyramids after this step and were strong enough to withstand additional handling.

About 100 g of calcined shaped abrasive precursor particles were placed in an alumina crucible and sintered in a Model KKSK-666-3100 electrically heated furnace from Keith Furnaces using a heating rate of 25° C./min and a hold time of 45 min at the final temperature of 1500° C. Density and grain size were determined as described in Example 1, and were 97.5% and 2.87 microns respectively. Their grinding performance was evaluated as described in Example 1. Total cut of 965 g was obtained.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making shaped abrasive particles, the method comprising:
   providing a slurry comprising non-colloidal solid particles and a liquid vehicle, wherein at least some of the non-colloidal solid particles comprise aluminum oxide powder, and wherein the non-colloidal solid particles comprise at least 30 percent by volume of the slurry;
   forming at least a portion of the slurry into shaped bodies contacting a substrate, wherein the shaped bodies are formed substantially according to a predetermined shape;
   at least partially drying the shaped bodies to provide shaped abrasive precursor particles;
   separating at least a portion of the shaped abrasive precursor particles from the substrate; and
   converting at least a portion of the shaped abrasive precursor particles into shaped abrasive particles, wherein the shaped abrasive particles comprise alpha alumina having an average crystal grain size of 2.7 to 8 microns and an apparent density that is at least 92 percent of the true density, and wherein the shaped abrasive particles contain 0.03 to 0.08 percent of sodium oxide based on the total weight of the shaped abrasive particles.

2. The method of claim 1, wherein the substrate has cavities on a surface thereof, and wherein said forming the slurry into shaped abrasive precursor particles contacting the substrate comprises urging the slurry into at least a portion of the cavities.

3. The method of claim 1, wherein said shaping the slurry comprises urging the slurry through a screen onto the substrate.

4. The method of claim 1, wherein said converting at least a portion of the shaped abrasive precursor particles into the shaped abrasive particles comprises:
   sintering the shaped abrasive precursor particles to provide the shaped abrasive particles.

5. The method of claim 1, wherein said converting at least a portion of the shaped abrasive precursor particles into the shaped abrasive particles comprises:
   calcining the shaped abrasive precursor particles to provide calcined shaped abrasive precursor particles; and
   sintering the calcined shaped abrasive precursor particles to provide the shaped abrasive particles.

6. The method of claim 1, wherein said converting at least a portion of the shaped abrasive precursor particles into the shaped abrasive particles comprises:
   impregnating the shaped abrasive precursor particles with a metal salt solution to provide impregnated shaped abrasive precursor particles; and
   sintering the impregnated shaped abrasive precursor particles to provide the shaped abrasive particles.

7. The method of claim 1, wherein said converting at least a portion of the shaped abrasive precursor particles into the shaped abrasive particles comprises:
   calcining the shaped abrasive precursor particles to provide calcined shaped abrasive precursor particles;
   impregnating the calcined shaped abrasive precursor particles with a metal salt solution to provide impregnated calcined shaped abrasive precursor particles; and
   sintering the impregnated calcined shaped abrasive precursor particles to provide the shaped abrasive particles.

8. The method of claim 1, wherein the slurry further comprises a thickener.

9. The method of claim 8, wherein the thickener comprises colloidal boehmite.

10. Shaped abrasive particles made according to the method of claim 1.

11. Shaped abrasive particles comprising alpha alumina, wherein the alpha alumina has an average crystal grain size of 2.7 to 8 microns, wherein the alpha alumina has an apparent density that is at least 92 percent of the true density, wherein the shaped abrasive particles conform to a nominal predetermined shape, and wherein the shaped abrasive particles contain 0.03 to 0.08 percent of sodium oxide based on the total weight of the shaped abrasive particles.

12. An abrasive article comprising shaped abrasive particles retained in a binder, wherein the shaped abrasive particles comprising alpha alumina, wherein the alpha alumina has an average crystal grain size of from 2.7 to 8 microns, wherein the alpha alumina has an apparent density that is at least 92 percent of the true density, wherein the shaped abrasive particles conform to a nominal predetermined shape, and wherein the shaped abrasive particles contain 0.03 to 0.08 percent of sodium oxide based on the total weight of the shaped abrasive particles.

13. A method of abrading a workpiece, the method comprising contacting the abrasive article of claim 12 with the workpiece, and moving at least one of abrasive article or the workpiece relative to the other to abrade at least a portion of the workpiece.

14. The shaped abrasive particles of claim 11, wherein the predetermined shape is a truncated trigonal pyramid.

15. The method of claim 1, wherein the alpha alumina has an average crystal grain size of 3.6 to 3.9 microns.

16. The shaped abrasive particles of claim 11, wherein the alpha alumina has an average crystal grain size of 3.6 to 3.9 microns.

17. The abrasive article of claim 12, wherein the alpha alumina has an average crystal grain size of 3.6 to 3.9 microns.

\* \* \* \* \*